United States Patent [19]

Rees

[11] Patent Number: 4,826,899

[45] Date of Patent: May 2, 1989

[54] LOW SMOKE GENERATING, HIGH CHAR FORMING, FLAME RESISTANT THERMOPLASTIC MULTI-BLOCK COPOLYESTERS

[75] Inventor: Richard W. Rees, Geneva, Switzerland

[73] Assignee: E. I. Du Pont De Nemours and Company, Wilmington, Del.

[21] Appl. No.: 100,219

[22] Filed: Sep. 23, 1987

Related U.S. Application Data

[63] Continuation-in-part of Ser. No. 57,564, Jun. 15, 1987, abandoned, which is a continuation-in-part of Ser. No. 890,712, Jul. 30, 1986, abandoned.

[51] Int. Cl.$^4$ ................................................ C08K 5/54
[52] U.S. Cl. ...................................... 524/94; 524/262; 524/424; 524/425; 524/433; 524/436; 524/437; 524/604
[58] Field of Search ............... 524/433, 437, 436, 425, 524/424, 94, 447, 445, 604, 605, 262

[56] References Cited

U.S. PATENT DOCUMENTS

| | | | |
|---|---|---|---|
| 3,862,070 | 1/1975 | Fukushima et al. | 524/140 |
| 3,983,290 | 9/1976 | Elcik | 428/285 |
| 4,129,535 | 12/1978 | Elcik | 260/23 XA |
| 4,147,690 | 4/1979 | Rich | 524/437 |
| 4,173,561 | 11/1979 | Tabana et al. | 524/433 |
| 4,243,579 | 1/1981 | Keogh | 524/433 |
| 4,396,730 | 8/1983 | Imahashi | 524/436 |
| 4,407,992 | 10/1983 | Keogh | 524/436 |
| 4,521,557 | 6/1985 | McKenna | 524/94 |
| 4,582,866 | 4/1986 | Shain | 524/94 |
| 4,659,871 | 4/1987 | Smith et al. | 174/113 R |
| 4,698,379 | 10/1987 | Nakaya et al. | 524/436 |
| 4,708,975 | 11/1987 | Shain | 524/412 |

FOREIGN PATENT DOCUMENTS

| | | |
|---|---|---|
| 56-4453 | 1/1981 | Japan . |
| 2134127 | 1/1984 | United Kingdom . |

OTHER PUBLICATIONS

Modern Plastics Encyclopedia, 1984–85, pp. 121, 123–125.
Modern Plastics Encyclopedia, Oct. 1980, vol. 57, No. 10A, pp. 180–182.
Rubber Chemistry & Tech., vol. 48, pp. 124–131 (1975).

*Primary Examiner*—Veronica P. Hoke

[57] ABSTRACT

A low smoke generating, high char forming, substantially nondripping flame resistant thermoplastic multi-block copolyester wherein the weight ratio of high melting point blocks to low melting point blocks is from about 8:1 to 1:4, and said copolyester has a melting point below about 175° C., said copolyester composition containing a bromine containing flame retardant; antimony trioxide; a drip suppressant for the multi-block copolyester, 25–65 parts per 100 parts multi-block copolyester of 50–88% alumina trihydrate and 12–50% of a magnesium compound selected from the group consisting of magnesium carbonate, magnesium oxide, and particulate magnesium hydroxide and, optionally, containing calcium carbonate and, preferably, containing a coupling agent having a hydrolyzable moiety containing titanium or silicon and an organophilic group.

23 Claims, No Drawings

LOW SMOKE GENERATING, HIGH CHAR FORMING, FLAME RESISTANT THERMOPLASTIC MULTI-BLOCK COPOLYESTERS

BACKGROUND OF THE INVENTION

This application is a continuation-in-part of Application Ser. No. 57,564 filed June 15, 1987 which is a continuation-part of Application Ser. No. 890,712, filed July 30, 1986 all now abandoned.

Thermoplastic multi-block copolyester elastomers have gained acceptance in many fields because of their outstanding physical properties which are unique in relation to other thermoplastic polymers. However, copolyester elastomers are flammable and this limits their usefulness for preparing electrical parts, wire coverings for telecommunications, optical fiber outer jacketing and other applications where fire retardant materials are needed.

Numerous halogenated organic compounds either alone or in combination with antimony trioxide have been tested and recommended for use in polyester homopolymers or random copolyesters, as have various inorganic additives. Because of the relatively high flammability of multi-block copolyesters, the ease with which such copolyesters undergo degradation during melt processing, and the difficulty of retaining a useful amount of flexibility in the multi-block copolyesters in the presence of significant amounts of added materials, there still is a need for fully acceptable fire resistant multi-block copolyester compositions that are substantially nondripping when burned and, most importantly, the copolyester compositions should generate a minimum amount of smoke and form a large amount of char when burned. Also, the thermoplastic compositions must be extrudable and retain a good combination of physical properties. The present invention provides flame resistant multi-block copolyester compositions which do not exhibit enhanced degradation. The compositions of this invention are low smoke generating and high char forming; do not drip when burned; and have V-O ratings for flammability according to the UL-94 Vertical Burn Test.

Recently, substantially nondripping flame resistant multi-block copolyester compositions have been developed by incorporating in the copolyester a combination of a flame retardant to resist burning and a drip suppressant such as fumed colloidal silica or an organophilic clay. Such flame resistant copolyester compositions that are substantially nondripping are described in U.S. Pat. No. 4,521,557 to McKenna dated June 4, 1985 and U.S. Pat. No. 4,582,866 to Shain dated April 16, 1986, both patents assigned to E. I. du Pont de Nemours and Company. These flame resistant copolyester compositions referred to above are quite useful especially for coverings on optical fibers and wire since they are substantially nondripping when burned. However, these flame resistant nondripping multi-block copolyester compositions when burned generate considerable amounts of smoke and, unfortunately, only small amounts of char. For many uses, for example plenum cable covering, the compositions should not only be flame resistant but the compositions should be as smokeless as possible. Smoke, of course, presents a serious hazard during a fire and causes secondary damage over a large area involved in the fire. Also, it is important that the compositions form a high percentage of char when burned. High char formation is beneficial because char has enough integrity to remain in place, for example, on a bundle of wires, while the polymer is burning and the char functions during the fire as an insulator. The char keeps some of the heat of the external fire away from the wire bundle, minimizing its contribution to the flame and maximizing the length of time during which the wires perform their normal function. Many compositions have been rejected by manufacturers because of the large amounts of smoke they generate and the small amount of char formation made by the polymers when burned.

The present invention that is directed to a novel copolyester composition is especially useful for covering bundles of insulated telecommunication wires, e.g., optical fibers, metal wires, etc., with a flame-protective jacketing material. The copolyester compositions of the present invention are not only flame resistant and substantially nondripping but, in addition, most importantly, these compositions burn without generating much smoke and they form large amounts of char. The copolyester compositions of this invention can be characterized as low smoke generating and high char forming, primarily due to the addition of relatively small amounts of char-forming additives, and can do so without intumescing into a ceramic barrier. The copolyesters used in the flame retardant compositions have a melt flow rate of at least 0.4 g/10 minutes, usually 0.9 g/10 minutes, at 190° C. which makes the compositions readily processible. Also, to substantially improve the physical properties of the composition of this invention coupling agents, when added, have unexpectedly substantially increased the tensile strength of the compositions.

SUMMARY OF THE INVENTION

The present invention provides a low smoke generating, high char forming, substantially nondripping, flame resistant thermoplastic copolyester composition which comprises (a) a multi-block copolyester, or blends thereof, of film forming molecular weight consisting essentially of (A) repeating high melting point blocks comprising repeating short chain ester units having the formula

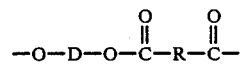

wherein D is a divalent radical remaining after the removal of hydroxyl groups from a low moleclar weight diol having a molecular weight not greater than 250 and R is a divalent radical remaining after the removal of carboxyl groups from a dicarboxylic acid having a molecular weight not greater than 300, D and R being selected so that a polymer consisting essentially of short chain ester units having a number average molecular weight of at least 5000 has a melting point of at least 150° C., (B) repeating low melting point blocks which are derived from compounds containing hydroxyl groups or carboxyl groups or mixtures thereof having a number average molecular weight of 400-4000 and a melting point not greater than about 100° C., and (C) an amount of difunctional radicals sufficient to join repeating blocks (A) and (B) to form a multi-block copolyester, the weight ratio of (A) to (B) being from about 8:1 to 1:4, preferably from about 5:1 to 1:2, said multi-block copolyester having a melting point below about 175° C., preferably 130°-170 ° C., (b) about 5-45 parts per 100 parts of said multi-block copolyester of a bromine containing organic flame retardant containing at least 50% by weight bromine, (c) about 0.20-1.5 parts per part of said bromine containing organic flame retardant of antimony trioxide, (d) a drip suppressant for the multi-block copolyester, and (e) from about 25-65 parts per hundred parts multi-block copolyesters of inorganic compounds comprising 50-88 percent alumina trihydrate and 12-50 percent of a magnesium compound selected from the group consisting of (1) magnesium carbonate, (2) magnesium oxide, and (3) particulate magnesium hydroxide with 90% of the particles of magnesium hydroxide having a maximum dimension no more than 1 micrometer and the particles of magnesium hydroxide being surface treated to prevent agglomeration.

The low smoke generating, high char forming compositions preferably contain a coupling agent which, quite surprisingly, substantially increases the tensile strength and improves the elongation at break of the copolyester compositions. The coupling agents that are used in the copolyester composition are compounds having a hydrolyzable moiety containing titanium or silicon and also an organophilic group. The hydrolyzable moieties are usually aliphatic orthosilicate or orthotitanate groups.

The compositions of the present invention are readily processible by conventional rubber extrusion techniques. The compositions are especially useful for plenum cable jacketing for telecommunication wires and optical fibers due principally to the low amount of smoke generated and the high amount of char formed when the compositions are burned, the high melt flow indices and the high tensile strength of the thermoplastic compositions.

DETAILED DESCRIPTION OF THE INVENTION

The novel low smoke generating, high char forming, flame resistant thermoplastic multi-block copolyester compositions have incorporated therein effective amounts of a bromine containing organic flame retardant; antimony trioxide; a drip suppressant for the multi-block copolyester, e.g., an organophilic clay, fumed colloidal silica, or polytetrafluoroethylene, usually having particle sizes less than about 200 micrometers; about 25-65 parts, preferably 30-60 parts, per hundred parts multi-block copolyester of inorganic compounds comprising 50-88 percent, preferably 60-75 percent, alumina trihydrate and 12-50 percent, preferably 25-40 percent of a magnesium compound selected from the group consisting of (1) magnesium carbonate (2) magnesium oxide, and (3) particulate magnesium hydroxide with 90 percent of the particles of magnesium hydroxide having a maximum dimension no more than 1 micrometer and the particles of magnesium hydroxide are surface treated to prevent agglomeration. The incorporation of the magnesium compound and alumina trihydrate in the flame resistant, substantially nondripping multi-block copolyester composition does not substantially interfere with the other properties of the composition and, surprisingly, results in a composition that when burned, has a V-O rating under the UL-94 Vertical Burn Test, generates a very low percentage of smoke and a very high percentage of char when compared to similar compositions without the magnesium compounds described herein.

It has been found that a superior copolyester composition can be made if the composition contains inorganic compounds such as alumina trihydrate and a magnesium compound selected from magnesium carbonate, magnesium hydroxide and magnesium oxide, plus a coupling agent. The addition of a coupling agent has the beneficial effect of substantially increasing the tensile strength and improving the elongation at break of the copolyester composition without detracting from the other valuable properties of low smoke generation and high char formation of the polymer composition. The coupling agents used in the present invention contain a hydrolyzable moiety containing titanium or silicon and also an organophilic group. Usually, the hydrolyzable moiety is one or more aliphatic silicate orthoester groups or aliphatic titanate orthoester groups, and can be a chelate group. Representative organophilic groups in the coupling agent include: phosphate esters, pyrophosphate esters, phosphite esters, carboxylic esters, aromatic orthoesters, sulfonyl esters, alkyl or substituted alkyl esters, vinyl esters and epoxy esters. Representative coupling agents, such as described above, have the following chemical structures. Organotitanate coupling agents of the formula $(RO)_m$-$Ti(OXR^2Y)_n$ where (RO) is a monoalkoxy group or two (RO) groups are a chelate group, usually the alkoxy group contains 1-5 carbon atoms, X is sulfonyl, phosphato, pyrophosphato or phosphito; $R^2$ is an alkylidene group, usually containing 3-20 carbon atoms or an arylene group, usually containing 6-12 carbon atoms; Y is hydrogen, an alkyl group, usually containing 1-6 carbon atoms, a vinyl group, an amino group or a mercapto group; m is 1-3 and n is 1-3. Silane coupling agents of the formula $YRSiX_3$ where Y is a functional organic group, especially an amino, a methacryloxy or epoxy group; R is an alkylidene group, usually containing 2-4 carbon atoms, and X is a hydrolyzable group, especially alkoxy, usually containing 1-2 carbon atoms.

Representative coupling agents having a hydrolyzable moiety containing titanium or silicon and an organophilic group include titanium IV, bis (dioctyl) pyrophosphato-O, oxyethylanediolato, (adduct), dioctyl hydrogen phosphite; tetraisopropyl, di[dioctylphosphito]titanate; di[dioctylpyrophosphito]ethylene titanate; methacrylic functional amine salt of di[dioctylpyrophosphato]ethylene titanate; isopropyl, tri(dioctylphosphato) titanate; isopropyl tri (dioctylpyrophosphato) titanate; titanium di (dioctylphosphate oxyacetate; isopropyl triisostearoyl titanate; titanium dimethacrylate, oxyacetate; isopropyl diisostearyl-methacryl titanate; isopropyl,4-aminobenzenesulfonyl titanium isostearate, methacrylate oxyacetate; isopropyl, tricumylphenyl titanate; isopropyl,tri(dioctylpyrophosphato) titanate. Representative silane coupling agents include compounds having the formula $(RO)_3Si$—$R_1$—$SO_2N_3$ where R is an alkyl group, usually having 1-2 carbon atoms, and $R_1$ is an alkylidene group, usually having 1-4 carbon atoms. Other representative silane coupling agents include 3-aminopropyltriethoxysilane, vinyl triethoxysilane, 3-methacryloxypropyl,trimethoxysilane, beta-cyclohexylethyltrimethoxy silane, 3-chloroisobutyltriethoxysilane, vinyl-tris (beta-methoxyethoxy) silane; gamma amino propyltriethoxy silane; gamma-mercaptopropyltrimethoxysilane and gamma chloropropyltrimethoxysilane.

The coupling agents used in the present invention are well known in the art and they are also described in Modern Plastics Encyclopedia 1984–1985, pages 121, 123 to 125; Ken-React References Manual, Bulletin No. KR-0278-7 Rev. and U.S. Pat. Nos. 4,083,820, 4,096,110, 4,094,853, and 4,163,004, the disclosures of which are incorporated herein by reference.

The amount of coupling agent added to the copolyester elastomer can be from about 0.1–5 parts per 100 parts copolyester, usually 0.5–3 parts. The coupling agents can be added to the copolyester composition either in solid form or mixed with a carrier such as mineral oil.

The coupling agents can be added to the composition either before or after the inorganic material, e.g., alumina trihydrate and magnesium compound, has been added. Preferably, they are added to the non-polymeric ingredients, with vigorous agitation, before the melt blending step. The reaction between the coupling agent and the inorganic material and copolyester elastomer occurs when the composition is at elevated temperatures of the order of about 150°–200° C.

It is believed that the inorganic portion of the coupling agent reacts with the hydroxy groups on the surface of the particles of the inorganic compound and the organic portion of the coupling agent readily blends with the copolyester elastomer. The most important effect is that the copolyester composition shows a significant and unexpectedly high increase in tensile strength without detrimentally affecting the other properties of the flame retardant composition.

The thermoplastic multi-block copolyesters useful in this invention consist essentially of repeating blocks of repeating short chain ester units, as described above, which have high melting points (at least 150° C.) and repeating low melting point blocks (not greater than 100° C.) which have a number average molecular weight of about 400–4000. The low melting point and high melting point blocks are joined together by difunctional radicals which, for example, can be derived by reaction of the high or low melting point blocks with diols, dicarboxylic acids, diepoxides or diisocyanates. The high melting blocks crystallize at useful service temperatures to provide physical crosslinks in the multi-block elastomer while the low melting blocks provide elastomeric characteristics. At processing temperatures, generally of the order of 150°–200° C., the high melting point blocks melt and the molten polymer may be processed as a thermoplastic. The melt processing temperature must be below the decomposition temperature of alumina trihydrate; otherwise the copolyester will be hydrolyzed, decreasing its molecular weight and therefore its physical properties. Preferably each copolyester should have a melting point, as measured by differential scanning calorimetry, ASTM D-3418 within the range of from about 130°–175° C. A copolyester having a melting point below about 175° C. can be obtained by procedures well known in the art, for example, by regulating the number of short-chain ester units in the copolyester or blend of copolyesters. The fewer the short-chain ester units, which are the hard segments, the lower the melting point, or a copolyester can be prepared using a mixture of dicarboxylic acids, e.g., isophthalic acid and terephthalic acid to lower the melting point of the copolyester elastomer.

The ratio of high melting point blocks to low melting point blocks can be between 8:1 and 1:4, preferably between 5:1 and 1:2. When a mixture of two or more different copolyesters is used, the weight average of their high melting point block:low melting point block ratios is within one of the above ranges. It is important that the ratio of high melting point blocks to low melting point blocks in the copolyester is within the range described to obtain the properties needed for the uses contemplated. For example, if the amount of high melting point blocks exceeds the ratio, the resulting composition will not have sufficient flexibility to bend without cracking.

The high melting point blocks which comprise repeating short chain ester units of the formula

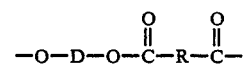

are derived from one or more low molecular weight diols, HODOH, having a molecular weight not greater than 250 and one or more dicarboxylic acids, HOOCR-COOH, having a molecular weight of not greater than 300.

The term "low molecular weight diols" as used herein should be construed to include equivalent ester-forming derivatives, provided, however, that the molecular weight requirement pertains to the diol only and not to its derivatives.

Aliphatic or cycloaliphatic diols with 2–15 carbon atoms are preferred, such as ethylene, propylene, tetramethylene, pentamethylene, 2,2-dimethyltrimethylene, hexamethylene, and decamethylene glycols, dihydroxy cyclohexane and cyclohexane dimethanol. Unsaturated diols such as butene-2-diol-1,4 can also be used, particularly in minor amounts in admixture with butanediol-1,4.

The term "dicarboxylic acids" as used herein, includes equivalents of dicarboxylic acids having two functional carboxyl groups which perform substantially like dicarboxylic acids in reaction with glycols and diols in forming copolyester polymers. These equivalents include esters and ester-forming derivatives, such as acid anhydrides. The molecular weight requirement pertains to the acid and not to its equivalent ester or ester-forming derivative.

Both aliphatic dicarboxylic acids, such as cyclohexane dicarboxylic acid, and aromatic dicarboxylic acids can be used, preferably aromatic dicarboxylic acids are employed. Among the aromatic dicarboxylic acids for preparing the copolyester polymers, those with 8–16 carbon atoms are preferred, particularly the phenylene dicarboxylic acids, i.e., phthalic, terephthalic and isophthalic acids and their dimethyl esters and mixtures thereof.

The diol and dicarboxylic acid must be chosen to provide a melting point of at least 150° C. for a polymer having a number average molecular weight of at least 5000 and being derived exclusively from short chain ester units. Preferred high melting point blocks are derived from ethylene glycol or 1,4-butanediol by reaction with terephthalic acid alone or in admixture with up to about 30% by weight isophthalic acid or phthalic acid or mixtures thereof. Polymers based on 1,4-butanediol are especially preferred.

The low melting point blocks in said multi-block copolyesters can be provided by a variety of compounds having number average molecular weights of 400–4000 which contain hydroxyl groups or carboxyl groups or mixtures thereof. Suitable compounds for forming low melting blocks include poly(alkylene oxide) glycols, polyoxyalkylene diimide diacids, low melting polyester glycols and hydrocarbon glycols or diacids.

Representative poly(alkylene oxide) glycols that can be used to make the multi-block copolyester have a carbon-to-oxygen atomic ratio of about 2.0–4.3 and have a number average molecular weight of about 400–4000 and include poly(ethylene oxide) glycol, poly(1,2- and 1,3-propylene oxide) glycol, poly(tetramethylene oxide) glycol, random or block copolymers of ethylene oxide and 1,2-propylene oxide, and random or block copolymers of tetrahydrofuran with minor amounts of a second monomer such as ethylene oxide. Preferred poly(alkylene oxide) glycols include poly(tetramethylene oxide) glycol having a number average molecular weight of 600–1600, especially 800–1200, and ethylene oxide-capped poly(propylene oxide) glycol having a number average molecular weight of 1500–2800 and an ethylene oxide content of 15–35% by weight.

Polyoxyalkylene diimide diacids suitable for use herein are high molecular weight diimide diacids wherein the average molecular weight is greater than about 700, most preferably greater than about 900. They may be prepared by the imidization reaction of one or more tricarboxylic acid compounds containing two vicinal carboxyl groups or an anhydride group and an additional carboxyl group which must be esterifiable and preferably is nonimidizable with a high molecular weight polyoxylalkylene diamine.

In general, the polyoxyalkylene diimide diacids useful herein may be characterized by the following formula:

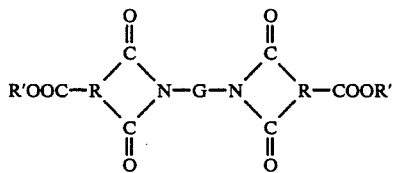

wherein each R is independently a trivalent organic radical, preferably a $C_2$ to $C_{20}$ aliphatic, aromatic or cycloaliphatic trivalent organic radical; each R, is independently hydrogen or a monovalent organic radical preferably selected from the group consisting of $C_1$ to $C_6$ aliphatic and cycloaliphatic radicals and $C_6$ to $C_{12}$ aromatic radicals, e.g. benzyl, most preferably hydrogen; and G is the radical remaining after the removal of the terminal (or as nearly terminal as possible) hydroxy groups of a long chain ether glycol having an average molecular weight of from about 600 to about 12000, preferably from about 900 to about 4000, and a carbon-to-oxygen atomic ratio of from about 1.8 to about 4.3. The polyetherimide esters which can be derived from these polyoxyalkylene diimide diacids are described in U.S. Pat. Nos. 4,556,705 and 4,556,688.

The required low melting (i.e., below about 100° C.) polyester glycols are either polylactones or the reaction products of low molecular weight diols (i.e., less than about 250) and an aliphatic dicarboxylic acid. Representative low melting polyester glycols are obtained by reaction of diols such as ethylene glycol, 1,4-butanediol, pentanediol, hexanediol, 2,2-dimethyl-1,3-propanediol and mixtures of ethylene glycol and propylene glycol with diacids such as adipic acid, glutaric acid, pimelic acid, suberic acid and isosebacic acid. Polylactone glycols derived from unsubstituted and substituted caprolactone or butyrolactone are also useful as low melting polyester glycols. Preferred polyester glycols include polycaprolactone glycol and poly(tetramethylene adipate) glycol having number average molecular weights of 800–2500.

Representative hydrocarbon glycols or diacid derivatives which can be used to provide low melting point blocks include polybutadiene or polyisoprene glycols and saturated hydrogenation products of these materials. Dicarboxylic acids formed by oxidation of polyisobutylene/diene copolymers are also useful materials. Dimer acid, particularly the more highly refined grades, is a useful hydrocarbon diacid which can be used alone or in combination with other low melting point compounds such as the poly(alkylene oxide) glycols and polyoxyalkylene diimide diacids to provide low melting point blocks.

The multi-block copolyester described herein of film forming molecular weight can be made by procedures known in the art. Copolyesters in which the low melting point blocks are provided by poly(alkylene oxide) glycols or hydrocarbon glycols or diacids are readily made by ester interchange reactions followed by polycondensation. Different procedures are required when the low melting point block is provided by a polyester glycol because ester exchange can take place with the high melting point ester blocks which ultimately destroys the blockiness of the polymer.

A typical procedure for preparing multi-block copolyesters by ester interchange involves heating a dicarboxylic acid or its methyl ester with a poly(alkylene oxide) glycol or hydrocarbon glycol (or diacid or mixtures thereof) and a molar excess of low molecular weight diol in the presence of a catalyst at about 150°–260° C. and a pressure of 0.05 to 0.5 MPa, usually ambient pressure, while distilling off water formed by esterification and/or methanol formed by ester interchange. The glycol or the diacid that provide the low melting point blocks are incorporated into the polymer through difunctional radicals provided by the dicarboxylic acid in the case of the glycols, or by the low molecular weight diols in the case of the diacids. The particular amount of difunctional radicals incorporated into the polymer will vary and depends on the molecular weights and the ratio of the high and low melting point blocks and the functional groups on the blocks. However, in all cases the difunctional radicals constitute a minor amount of the total weight of the polymer.

Depending on temperature, catalyst, glycol excess and equipment, this reaction can be completed within a few minutes, e.g., about two minutes, to a few hours, e.g.; about two hours. This procedure results in the preparation of a low molecular weight prepolymer which can be carried to a high molecular weight multi-block copolyester by distillation of the excess of short-chain diol. The second process stage is known as "polycondensation".

Additional ester interchange occurs during this polycondensation which serves to increase the molecular weight of the polymer. Best results are usually obtained if this final distillation or polycondensation is run at less than about 670 Pa, preferably less than about 250 Pa, and about 200°–280° C., preferably about 220°–260° C., for less than about two hours, e.g., about 0.5 to 1.5 hours. It is customary to employ a catalyst while carrying out ester interchange reactions. While a wide variety of catalysts can be employed, organic titanates such as tetrabutyl titanate used alone or in combination with magnesium or calcium acetates are preferred. The catalyst should be present in an amount of about 0.005 to 2.0 percent by weight based on total reactants.

Batch or continuous methods can be used for any stage of polymer preparation. Polycondensation of prepolymer can also be accomplished in the solid phase by heating divided solid prepolymer in a vacuum or in a stream of inert gas to remove liberated low molecular weight diol.

Several procedures have been used to prepare multi-block copolyesters wherein the low melting point blocks are polyesters as well as the high melting point blocks. One procedure involves carrying out a limited ester interchange reaction in the presence of an exchange catalyst between two high molecular weight polymers such as poly(butylene terephthalate) and poly(butylene adipate). Ester exchange at first causes the introduction of blocks of one polyester in the other polyester chain and vice versa. When the desired multi-block polymer structure is formed the catalyst is deactivated to prevent further interchange which ultimately would lead to a random copolyester without any blockiness. This procedure is described in detail in U.S. Pat. No. 4,031,165 to Saiki et al. Other useful procedures involve coupling of preformed blocks of high and low melting point polyester glycols. Coupling can be accomplished by reaction of a mixture of the blocks with a diisocyanate as described in European Patent No. 0013461 to Huntjens et al. Coupling can also be accomplished by heating the mixed blocks in the presence of terephthaloyl or isophthaloyl bis-caprolactam addition compounds. The caprolactam addition compounds react readily with the terminal hydroxyl groups of the polyester blocks, splitting out caprolactam and joining the blocks through ester linkages. This coupling method is described in Japanese Patent No. 700740 (Japanese Patent Publication No. 73/4115). Another procedure of use when the low melting blocks are to be provided by polycaprolactone involves reacting a preformed high melting point block terminated with hydroxyl groups with epsilon-caprolactone in the presence of a catalyst such as dibutyl tin dilaurate. The caprolactone polymerizes on the hydroxyl groups of the high melting point ester block which groups serve as initiators. The resulting product is a segmented polymer having high melting point blocks with low melting point polycaprolactone blocks. The segmented polymer is hydroxyl terminated and may be chain extended to give high molecular weight products by reaction with a diepoxide such as diethylene glycol diglycidyl ether, see Japanese Patent Publication No. 83/162654.

The flame resistance of the multi-block compositions of this invention is partly due to the combination of a bromine containing organic flame retardant and antimony trioxide. The organic flame retardant is incorporated in the copolyester in amounts of about 5–45 parts per hundred parts of multi-block copolyester, preferably 24–30 parts per hundred parts of multi-block copolyester. Any bromine containing organic flame retardant which has a bromine content of at least 50% by weight and that, preferably, exhibits a weight loss not greater than 5% at 200° C. as determined by thermogravimetric analysis in air at a heating rate of 10° C./minute can be used. These parameters insure that the flame retardant will be effective in the amounts specified and that the flame retardant will not volatilize or degrade during processing. Preferably, the organic flame retardant added to the copolyester composition is free of functional groups that form ester linkages. Representative bromine-containing organic flame retardants include decabromodiphenyl ether, octabromodiphenyl ether, tetrabromophthalic anhydride, bis(tribromophenoxy)ethane, bis(pentabromophenoxy)ethane, hexabromocyclododecane and N,N'-ethylenebis(tetrabromophthalimide). Of these N,N'-ethylenebis(tetrabromophthalimide) is especially preferred because of its high melting point, good stability and resistance to blooming. The flame retardant, N,N'-ethylenebis(tetrabromophthalimide), can be prepared by reacting 2 moles of tetrabromophthalic anhydride with 1 mole of ethylene diamine in a suitable solvent such as N-methyl-2-pyrrolidone at about 200° C., as described in U.S. Pat. No. 4,374,220. Preferably, the diimide should be in finely divided form, usually having particles of less than about 100 mesh or 100 micrometers, when added to the copolyester composition.

The antimony trioxide, optionally containing small amounts of antimony pentoxide, is incorporated in the multi-block copolyester in an amount of about 0.20–1.5 parts, preferably about 0.3–0.6 parts, per part of bromine containing organic flame retardant. Any of the commercially available sources of antimony trioxide can be used in the copolyester composition. It is convenient to use a small particle size, for example, 0.2–0.25 micrometers.

In order to minimize or eliminate dripping when exposed to a flame, the multi-block copolyester compositions contain a drip suppressant. Various drip suppressants can be used in this composition and the magnesium compound incorporated in the multi-block copolyester also aids in preventing the copolyester from dripping when burned. Preferably, the drip suppressant is an organophilic clay, fumed colloidal silica or polytetrafluoroethylene. In all cases it is convenient to use a drip suppressant having a small particle size, for example, less than about 500 micrometers.

When organophilic clay is used as the drip suppressant, it is present in the copolyester compositions in an amount of at least about 1, preferably about 2–10 parts, most preferably 3–7 parts, per 100 parts of the multi-block copolyester. The organophilic clay used is the reaction product of at least one quaternary ammonium salt with a smectite-type clay having an ion exchange capacity of at least 75 meq/100 g of clay, said quaternary ammonium salts having the formula

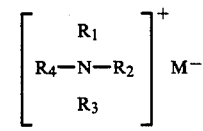

wherein $M^-$ is selected from the group consisting of chloride, bromide, iodide, nitrite, hydroxide, acetate, methyl sulfate and mixtures thereof, wherein $R_1$ is an alkyl group having 12 to 22 carbon atoms and wherein $R_2$, $R_3$ and $R_4$ are selected from the group consisting of hydrogen, alkyl groups containing 1 to 22 carbon atoms, aryl groups and aralkyl groups containing 1–22 carbon atoms in the alkyl chain.

Smectite-type clays which are useful in preparing the required organophilic clays include bentonite, montmorillonite, hectorite and saponite clays with bentonite and hectorite clays being preferred. The clays should have an ion exchange capacity of at least 75 meq/100 g of clay and preferably at least 95 meq/100 g of clay. Useful quaternary ammonium salts for modifying the clay by ion exchange must contain a cation having at least one long chain alkyl substituent having 12 to 22 carbon atoms. For reasons of economy most commercially available useful quaternary ammonium salts have one or more alkyl groups derived from hydrogenated tallow which is principally an octadecyl group. The preferred anion is the chloride ion. Representative quaternary ammonium salts which are useful in preparing the organophilic clays that can be used in the present invention include methyl benzyl di(hydrogenated tallow) ammonium chloride,
dimethyl benzyl (hydrogenated tallow) ammonium chloride,
dimethyl di(hydrogenated tallow) ammonium chloride,
methyl tri(hydrogenated tallow) ammonium chloride, and
benzyl tri(hydrogenated tallow) ammonium chloride.

An especially preferred clay is bentonite treated with a mixture of 10-90% by weight dimethyl benzyl (hydrogenated tallow) ammonium chloride and dimethyl di(-hydrogenated tallow) ammonium chloride.

The multi-block copolyester composition can contain at least about 2 parts, preferably about 3-20 parts, most preferably 3-8 parts, per 100 parts of copolyester, of the drip suppressant fumed colloidal silica. Usually, the drip suppressant has a mean particle diameter of less than 500, most preferably less than 100, millimicrons.

The multi-block copolyester composition can contain at least about 0.2 parts, preferably 0.2-2 parts, most preferably 0.2-1 parts, per 100 parts multi-block copolyester of polytetrafluoroethylene as an effective drip suppressant. The polytetrafluoroethylene is usually in the form of a powder.

To substantially reduce smoke generation when the multi-block copolyester thermoplastic composition is burning and to promote the formation of char, it is necessary to add to the multi-block copolyester the inorganic compounds alumina trihydrate and certain magnesium compounds in specific amounts. It has been discovered that, quite surprisingly, when the multi-block copolyester composition containing a brominated organic flame retardant contains 25-65 parts by weight, preferably 30-60 part by weight, per 100 parts of the multi-block copolyester of inorganic compounds of 50-88 percent alumina trihydrate, preferably 60-75 percent, and 12-50 percent, preferably 25-40 percent of a magnesium compound comprising magnesium carbonate or magnesium oxide or particulate magnesium hydroxide with 90 percent of the particulate magnesium hydroxide having a maximum dimension of no more than 1 micrometer and the particles of magnesium hydroxide are surface treated to prevent agglomeration, the resultant multi-block copolyester composition when burned shows a substantial reduction in the amount of smoke generated and the burned copolyester forms an unexpectedly high amount of char. It is believed that the low amount of smoke generated and high char formation, both values determined by the Arapahoe Smoke Chamber and Char Test, described below, are due primarily to the presence in the multi-block copolyester of the magnesium compound and alumina trihydrate.

The surface of the particulate magnesium hydroxide that is incorporated into the composition is treated to prevent, among other things, excessive agglomeration of particles. Excessive agglomeration causes the melt index value to decrease and processing becomes impractical. Any conventional material that can be coated on the surface of the magnesium hydroxide particles to prevent agglomeration is satisfactory. A composition that is both hydrophobic and hydrophilic, such as soaps, fatty acids, and salts of fatty acids, are especially effective. The hydrophilic portion of, for example, a fatty acid is attracted to the magnesium hydroxide and the hydrophobic portion is directed to the outer surface of the treated particle. Usually and conveniently, the particles of magnesium hydroxide are coated with a fatty acid or an inorganic salt of a fatty acid, usually having 10-20 carbon atoms, especially calcium stearate or calcium oleate.

The particles of magnesium hydroxide can have various shapes. It has been found that hexagonal shaped particles are preferred because these particles show less of a tendency to agglomerate than, for example, spherical particles.

The particles of magnesium oxide are preferably coated with calcium stearate to improve the melt flow index of the thermoplastic composition and, accordingly, its processibility.

The alumina trihydrate that is used in the present invention in the amounts disclosed has a small particle size, generally the average particle diameter is no greater than about 30 micrometers, usually not greater than about 2 micrometers.

Calcium carbonate can be used to replace up to about 50% of the alumina trihydrate when magnesium hydroxide is used. In other words, the thermoplastic composition can contain 30-60 parts per hundred parts copolyester of inorganic compounds comprising 12-50 percent magnesium hydroxide and the balance alumina hydrate and calcium carbonate with the proviso that the amount of calcium carbonate is not greater than the amount of alumina trihydrate. The thermoplastic composition preferably contains about 25-44 percent calcium carbonate based on 30-60 parts per hundred parts multi-block copolyester of total inorganic compounds having a valence of 2 or 3, i.e. magnesium hydroxide and alumina trihydrate, and the amount of calcium carbonate is not greater than the amount of alumina trihydrate, e.g. 25-44 percent, present in the composition. The addition of calcium carbonate together with the magnesium hydroxide is beneficial because it aids in high temperature smoke reduction and char formation.

Not only do compositions of the present invention give V-O flammability ratings in the UL-94 Vertical Burn Test of Underwriters Laboratories Inc., and show reduced smoke and increased char in the Arapahoe Smoke Chamber and Char Test, but in Steiner Tunnel Tests (UL-910), reported in examples, cables jacketed with the magnesium hydroxide containing thermoplastic composition passed all phases of the test.

Any method which provides uniform mixing of the additives with the multi-block copolyester can be used to prepare the compositions of this invention. A preferred procedure involves dry blending all of the ingredients together followed by melt blending of the dry blend in single or twin screw extruder-mixers or internal mixers such as the Farrell Continuous Mixer (FCM) at a temperature above the melting point of the copolyester. The compositions can also be made by adding the flame retardant, antimony trioxide, drip-suppressant, e.g., organophilic clay, alumina trihydrate, magnesium compound, e.g., particulate magesium hydroxide, and optionally calcium carbonate, and a coupling agent, to the molten copolyester in a batch mixer or vessel provided with agitation means. The solid ingredients can be added separately in any order or may be dry blended prior to addition to the molten copolyester if desired.

Another convenient procedure for preparing the compositions of this invention makes use of a concentrated masterbatch of flame retardant, antimony trioxide, drip suppressant, alumina trihydrate, magnesium compound and coupling agent bound together by a minor amount of multi-block copolyester. Usually the concentrated masterbatch contains 15 to 35 percent by weight of copolyester which serves to bind the additive ingredients into pellets. The pellets of concentrated additive ingredients can be dry blended with pellets of unaltered copolyester and the pellet blend can in turn be fed directly to an injection molding machine or extruder to form flame resistant, low smoke generating, high char forming finished articles directly. The required concentrates can be prepared by mixing procedures such as those described hereinbefore.

It is usually desirable to stabilize the multi-block copolyester compositions of this invention against heat and/or light. Antioxidants, such as hindered phenols or aryl amines, are known to be effective for this purpose. Mixtures of these antioxidants with esters of thiodipropionic acid, mercaptides, phosphite esters and the like are useful. Stabilization against light can be obtained by compounding the copolyester with UV-absorbers and/or hindered amine photostabilizers. The use of these various agents in copolyesters is known to those skilled in the art. In addition to these additives, one can add minor amounts of fillers and colorants as desired and processing aids, such as stearic acid.

The compositions of this invention can be readily processed by a variety of techniques such as injection molding, compression molding and extrusion. Extrusion techniques are used for making cable jackets and optical fibers.

EXAMPLES

In the following examples, which further illustrate the present invention, parts and percentages are by weight unless otherwise indicated.

Copolyester A is prepared according to the following procedure: To a flask fitted with a distillation column and a stainless steel stirrer with a paddle cut to conform with the internal radius of the flask and positioned about 3 mm from the bottom of the flask, the following starting materials are charged:

| | |
|---|---|
| dimethyl terephthalate | 40.27 parts |
| dimethyl isophthalate | 11.7 parts |
| poly(tetramethylene oxide) glycol (number average molecular weight 1000) | 44.7 parts |
| 1,4-butanediol | 30 parts |
| N,N'—hexamethylenebis(3,5-di-tert-butyl-4-hydroxy-hydrocinnamamide) | 0.15 parts |
| N,N'—trimethylenebis(3,5-di-tert-butyl-4-hydroxy-hydrocinnamamide) | 0.15 parts |
| tetrabutyl titanate | 0.3 parts |

The flask is placed in an oil bath at 160° C., agitated for five minutes and then 0.3 parts of tetrabutyl titanate/1,4-butanediol solution is added. Methanol distills from the reaction mixture as the temperature s slowly raised to 250° C. over a period of one hour. When the temperature reaches 250° C., the pressure is gradually reduced to about 270 Pa within 20 minutes. The polymerization mass is agitated at 250° C. for 55–90 minutes. The condensation polymerization is discontinued by releasing the vacuum under nitrogen and the resulting viscous molten product is scraped from the flask in a nitrogen (water and oxygen free) atmosphere and allowed to cool. The resulting polymer has a melt flow rate of 5 g/10 min, measured at 190° C. by ASTM method D1238 condition E and a Shore D hardness value of 40 as measured by ASTM method D2240. The weight ratio of high melting point blocks to low melting point blocks is 1:1.06. The polymer had a melting point of 143° C. After shredding, the polymer is extruded at 200° C. to a 3–4 mm strand and cut into pellets 4–5 mm long.

Copolyester B was prepared by substantially the same procedure described above for the preparation of Copolyester A except that the following ingredients in the amounts given below were used.

| | |
|---|---|
| Dimethyl terephthalate | 52.5 parts |
| Dimethyl isophthalate | 22.5 parts |
| poly(tetramethylene oxide) glycol (number average molecular weight 1000) | 15.9 parts |
| 1,4 butanediol | 55 parts |
| N,N'—hexamethylenebis (3,5-di-tert-butyl-4-hydroxy-hydrocinnamamide) | 0.15 parts |
| N,N'—trimethylenebis (3,5-di-tert-butyl-4-hydroxy-hydrocinnamamide) | 0.15 parts |
| tetrabutyl titanate | 0.3 parts |

The resulting polymer has a melt flow rate of about 4.5 g/10 min measured at 190° C. by ASTM method D 1238 condition E and a Shore D hardness of 60 as measured by ASTM method D 2240. The weight ratio of high melting point blocks to low melting point blocks in this polymer is 1:0.22. The polymer has a melting point of 168° C. After shredding, the polymer is extruded at 200° C. to a 3–4 mm strand and cut into pellets 4–5 mm long.

Arapahoe Smoke Chamber and Char Test

Measurement of Smoke and Char Generation by use of the Arapahoe Smoke Chamber, Model 705, Arapahoe Chemicals, Boulder, Colo. is as follows: $1\frac{1}{2}''\times\frac{1}{2}''\times\frac{1}{8}''$ [38.1×12.7×3.175 mm] molded sample of the thermoplastic multi-block copolyester composition is burned for 30 seconds in an airflow of 4.5 cfm (0.13 m$^3$/min), using a calibrated propane burner. The smoke is collected on filter paper and weighed. The remaining char on the sample is removed and weighed. The percent smoke and percent char are calculated as follows.

$$\% \text{ Smoke} = \frac{\text{smoke wt}}{\text{total amount burned}} \times 100$$

$$\% \text{ Char} = \frac{\text{char wt}}{\text{total amount burned}} \times 100$$

The following ASTM methods are employed in determining the properties of the polymer compositions prepared in the examples which follow.

| Tensile strength and elongation at break, | D-412 |
|---|---|
| Melt flow rate | D1238 (method E) |
| Torsional Modulus (Clash-Berg) | D1043 |
| Shore D hardness | D2240 |

The flammability characteristics are determined according to the vertical burning test of the Underwriters Laboratories, Inc., Standard UL 94, 1980. The V-O classification indicates a higher degree of flame retardance than does a V-2 classification.

Organophilic clay is the reaction product of bentonite with a mixture of 83% by weight of dimethyl di(hydrogenated tallow) ammonium chloride and 17% by weight methyl benzyl di(hydrogenated tallow) ammonium chloride. The organophilic clay contains 60% by weight of non-volatiles at about 700° C. by thermogravimetric analysis.

Magnesium hydroxide has a hexagonal platelet particle shape where the maximum dimension of the particles is 0.8 micrometers and the particles are coated with a calcium salt of a fatty acid.

EXAMPLES 1-2

Flame resistant compositions having a low percent of smoke generation and a high percent of char formation are prepared by dry blending the ingredients listed below in the amounts given in the following table in a mixer. The resultant dry blend is then compounded in a Haake Rheocord sigma blade mixer heated to about 200° C. to obtain a uniform mixture.

| Ingredient | Parts By Weight 1 | 2 | Comparative Example |
|---|---|---|---|
| Copolyester A | 100 | 100 | 100 |
| N,N'—ethylenebis(tetrabromophthalimide) | 25 | 25 | 25 |
| Antimony trioxide (Laurel Fireshield Ultrafine II) | 12.5 | 12.5 | 12.5 |
| Magnesium hydroxide | 20 | 30 | 0 |
| Organophilic clay (Average Particle Diameter, 44 micrometers) | 5 | 5 | 5 |
| Alumina trihydrate (Average Particle Diameter, 1.1 micrometers) | 40 | 30 | 20 |
| Stearic Acid | 1 | 1 | 1 |
| Calcium Carbonate | — | — | 40 |

The resulting composition is granulated and compression molded at 200° C. Test specimens of the thermoplastic composition having the following dimensions, 127 mm × 12.7 mm × 3.2 mm (5"×½"×⅛"), are prepared by compression molding. Test results at specimen thickness of 3.2 mm for UL-94 Vertical Burn Test indicate the compositions have a V-O rating and are drip resistant during burning after either ignition. The compositions have high tensile strengths, and the melt flow rates show they are readily processable. Additionally, the specimens show unexpectedly low smoke generation and unexpectedly high char formation relative to unmodified comparative flame retardant Copolyester A that is the same as the composition of Example 1 except that it does not contain magnesium hydroxide.

| Stress/Strain at 23° C. | Properties Composition of Example 1 | 2 | Comparative Example |
|---|---|---|---|
| Tensile Strength, kPa | 9377 | 9894 | — |
| Melt Flow Rate, g/10 min. at 190° C. | 2.64 | 2.5 | 0.44** |
| Arapahoe smoke Chamber and Char Test | | | |
| % Smoke | 0.98 | 1.03 | 6.7 |
| % Char | 60.1 | 58.0 | 25.3 |
| UL-94 Vertical Burn Test 3.2 mm thickness | V-O | V-O | — |

*at 230° C.

EXAMPLES 3-8

The procedure described above in Examples 1 and 2 was repeated using the ingredients indentified below in the amounts given.

| Ingredients | Parts By Weight 3 | 4 | 5 | 6 | 7 | 8 |
|---|---|---|---|---|---|---|
| Copolyester A | 100 | 100 | 100 | 100 | 100 | 100 |
| N,N'—ethylenebis (tetrabromophthalimide) | 25 | 25 | 25 | 25 | — | — |
| Decabromodiphenyl oxide | — | — | — | — | 25 | — |
| Tetradecabromodiphenoxy benzene | — | — | — | — | — | 25 |
| Antimony trioxide | 12.5 | 12.5 | 12.5 | 12.5 | 12.5 | 12.5 |
| Organophilic clay | 5 | 5 | 5 | 5 | 5 | 5 |
| Magnesium hydroxide | 10 | 10 | 10 | 15 | 10 | 10 |
| Alumina trihydrate | 25 | 40 | 30 | 25 | 30 | 30 |
| Calcium carbonate | 25 | 10 | 20 | 20 | 20 | 20 |
| Stearic acid | 1 | 1 | 1 | 1 | 1 | 1 |

Test specimens were prepared as in Example 1 at 200° C. and the results are given below.

| Stress-Strain at 23° C. | Properties 3 | 4 | 5 | 6 | 7 | 8 |
|---|---|---|---|---|---|---|
| Tensile Strength, kPa | 10508 | 9191 | 9929 | 8991 | 7585 | 7929 |
| Melt Flow Rate, g/10 min. at 190° C. | 3.3 | 3.4 | 3.1 | 3.5 | 3.8 | 4.5 |
| Arapahoe Smoke Chamber and Char Test | | | | | | |
| % Smoke | 2.1 | 2.0 | 2.2 | 1.7 | 2.6 | 2.7 |
| % Char | 54.4 | 49.6 | 49.3 | 52 | 44.4 | 48.6 |
| UL-94 Vertical Burn Test 3.2 mm thickness | V-O | V-O | V-O | V-O | V-O | V-O |

The compositions have a V-O rating and did not drip when burned after either ignition. The compositions have a high tensile strength, and the melt flow rates indicate they are readily processable. The specimens show unexpectedly low smoke generation and unexpectedly high char formation.

EXAMPLE 9

A bundle of 25 pairs of 24 gauge copper wires each insulated with 0.14–0.15 mm of tetrafluoroethylene-hexafluoropropylene copolymer [Du Pont Teflon/FEP] was extrusion jacketed with 0.38 mm of the composition of Example 1 and in another test with 0.5 mm of the same composition. The jacketed cables were tested in accordance with Underwriters' Laboratory UL-910

"Test Method for Fire and Smoke Characteristics of Electrical and Optical Fiber Cables used in Air-Handling Spaces", using the UL Steiner Tunnel. The results are given below.

| Sample | Maximum Flame Propagation Distance Feet | Maximum Flame Propagation Distance Meters | Optical Density Peak | Optical Density Average |
|---|---|---|---|---|
| Cable with 0.38 mm jacket | 3.0 | — | 0.17 | 0.08 |
| Cable with 0.5 mm jacket | 3.5 | — | 0.20 | 0.08 |
| Maximum Values For Passing Test | 5.0 | 1.524 | 0.50 | 0.15 |

The experimental cable sample with the composition of the present invention passed the Steiner Tunnel test in all respects and the UL tests for abrasion, cold bend, and the joist pull.

EXAMPLE 10

| Ingredient | Parts By Weight |
|---|---|
| Copolyester A | 100 |
| N,N'ethylenebis(tetrabromophthalimide) | 25 |
| Antimony trioxide | 12.5 |
| Organophilic Clay | 5 |
| Stearic Acid | 1 |
| Calcium Stearate | 4 |
| Magnesium Oxide (Maglite Y) | 20 |
| Alumina trihydrate (Average Particle Diameter 1.1 Micrometers) | 40 |

Test specimens were prepared as described in Example 1 at 200° C. and the results are given below.

| Properties Stress/Strain at 23° C. | Example 10 |
|---|---|
| Tensile Strength, kPa | 10.340 |
| Melt Flow Rate, g/10 min. at 190° C. | 4.1 |
| Arapahoe Smoke Chamber and Char Test | |
| % Smoke | 2.6 |
| % Char | 43 |
| UL-94 Vertical Burn Test 3.2 mm thickness | V-O |

The composition had a V-O rating and was low smoke generating and showed high char formation.

EXAMPLES 11–13

| Ingredient | Parts By Weight 11 | Parts By Weight 12 | Parts By Weight 13 |
|---|---|---|---|
| Copolyester A | 100 | 100 | 100 |
| N,N'ethylenebis(tetrabromophthalimide) | 25 | 25 | 25 |
| Antimony trioxide | 12.5 | 12.5 | 17.5 |
| Organophilic Clay | 5 | 5 | 5 |
| Stearic Acid | 1 | 1 | 1 |
| Calcium Stearate | 4 | — | — |
| Magnesium Stearate | — | 10 | — |
| Basic magnesium carbonate | 20 | 10 | — |
| Magnesium hydroxide | — | — | 20 |
| Alumina trihydrate (Average Particle Diameter 1.1 micrometers) | 40 | 40 | 40 |

Test specimens were prepared as described in Example 1 and the results are given below.

| Properties Stress/Strain at 23° C. | Example 11 | Example 12 | Example 13 |
|---|---|---|---|
| Tensile Strength, kPa | 8964 | 10,136 | 10,618 |
| Melt Flow Rate g/10 min. at 190° C. | 1.0 | 6.8 | 1.6 |
| Arapahoe Smoke Chamber and Char Test | | | |
| % Smoke | 2.2 | 2.6 | 1.8 |
| % Char | 42 | 37 | 47.5 |
| UL-94 Vertical Burn Test, 3.2 mm thickness | V-O | V-O | V-O |

The composition had V-O ratings, they generated small percentages of smoke but high percentage of char when burned.

EXAMPLE 14

Flame resistant compositions having a low percent of smoke generation and a high percent of char formation and high tensile strength are prepared by dry blending the ingredients listed below in a mixer in the amounts given in the following table. The organotitanate coupling agent, $(OC(O)CH_2O)Ti[OP(O)(OH)\ OP(O)-(OC_8H_{17})_2]HP(O)(OC_8H_{17})_2$ and mineral oil were added dropwise to the nonpolymeric ingredients while they were vigorously agitated in a high intensity mixer. The treated ingredients were than dry blended with the copolyester in a Haake Rheocord sigma blade mixer heated to about 190° C. to obtain a uniform mixture. The resultant composition was extruded as an 0.46 mm coating over a cable bundle, as described in Example 9. The Arapahoe Smoke Chamber and Char Test resulted in 1.6% smoke and the char was 51%. The product had a V-O rating in the UL-94 test. The cable jacket was removed and tensile tests run at 5.08 cm per minute. The tensile strength was 21,720 kPa and the elongation at break was 590%.

EXAMPLE 15

The procedure described above in Example 14 was substantially repeated except that all ingredients with the exception of Copolyester A were first dry blended in a glass container and 1 part of the silane sulfonyl azide $(CH_3CH_2O)_3Si$—R—$SO_2N_3$, available as Az-Cup N liquid manufactured by Hercules, Inc., was added to the mix while stirring. The mixture was then melt blended, as described in Example 14, with Copolyester A and 0.51 mm thick slabs were compression molded. Tensile testing of the die-cut samples gave a tensile strength value of 11,240 kPa at break.

EXAMPLE 16

The procedure described above in Example 14 was substantially repeated except that 0.5 parts of liquid 3-aminopropyltriethoxysilane was added in place of the organotitanate coupling agent. The tensile strength at break was found to be 11,350 kPa and the melt flow was 3.3 g/10 minutes.

| Ingredient | 14 | 15 | 16 |
|---|---|---|---|
| Copolyester A | 100 | 100 | 100 |
| N,N'—ethylenebis (tetrabromo phthalimide) | 25 | 25 | 25 |
| Antimony oxide | 12.5 | 12.5 | 12.5 |
| Magnesium hydroxide | 20 | 20 | 20 |
| Organophilic clay | 5 | 5 | 5 |
| Alumina trihydrate | 40 | 40 | 40 |
| Stearic acid | 1 | 1 | 1 |
| Coupling agent | Organotitanate | Azidosilane | Silane |
| Quantity of coupling Agent | 1.0 | 1.0 | 0.5 |
| Tensile strength, kPa | 21,720 | 11,240 | 11,350 |

The compositions not only were low smoke generating and showed high char formation but had unusually high tensile strength values.

EXAMPLES 17-18

Flame and smoke retarded compositions having low smoke high char formation with low flaming time were prepared by blending the ingredients listed below in a mixer heated to about 170° C. to obtain a uniform mixture.

| Ingredient | 17 | 18 |
|---|---|---|
| Copolyester A | 50 | 0 |
| Copolyester B | 50 | 100 |
| N,N'—ethylenebis(tetrabromo phthalimide) | 30 | 30 |
| Antimony trioxide | 10 | 10 |
| Magnesium hydroxide | 18 | 18 |
| Alumina trihydrate | 36 | 36 |
| Organophilic clay | 5 | 5 |
| Stearic acid | 1 | 1 |
| Mineral oil | 2 | 2 |
| Coupling agent (titanium di (dioctylpyrophosphate) oxyacetate | 1 | 1 |
| Melt flow rate, ASTM D1238 method E, g/10 min | .5 | .5 |
| Tensile strength, kPa | 17,269 | 21,328 |
| Elongation to break, % | 415 | 305 |
| Arapahoe Smoke Chamber and Char test | | |
| % Smoke | 4.9 | 7.0 |
| % Char | 13.3 | 21.0 |
| % burned (amount burned/initial wt) | 3.18 | 2.83 |
| UL-94 Vertical Burn Test 1.6 mm thickness | V-O | V-O |

The Arapahoe Smoke Chamber and Char Test results for Examples 17 and 18 should not be compared directly with the results in the previous Examples. Because part or all of Copolyester A was replaced with Copolyester B, the % smoke data are with resulting higher aromatic content and lower ether content, the % smoke data are higher and the % char data are lower. On the other hand, a much smaller portion of the sample was burned in the Arapahoe test, and this is desirable performance. Also, the tensile strength was high in Examples 17 and 18.

EXAMPLE 19

A coaxial cable with a single 22 gage (0.635 mm) copper conductor insulated with foamed Teflon /(tetrafluoroethylene/hexafluoropropylene copolymer with 16 weight % HFP) 1.52 mm thick and shielded with bare copper (11.5 ohms/kilometer) braid, 95% shield coverage was extrusion jacketed with 0.51 mm of the composition of Example 17. The jacketed cable was tested as in Example 9 and the results were:

Maximum flame propagation distance=3 feet=0.91 meters

Peak optical density=0.28

Average optical density=0.06

I claim:

1. A low smoke generating, high char forming, substantially nondripping, flame retardant thermoplastic copolyester composition which comprises
   (a) a multi-block copolyester or blends thereof of film forming molecular weight consisting essentially of (A) repeating high melting point blocks comprising repeating short chain ester units having the formula

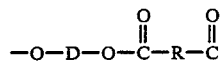

wherein D is a divalent radical remaining after the removal of hydroxyl groups from a low molecular weight diol having a molecular weight not greater than 250 and R is a divalent radical remaining after the removal of carboxyl groups from a dicarboxylic acid having a molecular weight not greater than 300, D and R being selected so that a polymer consisting essentially of short chain ester units having a number average molecular weight of at least 5000 has a melting point of at least 150° C., (B) repeating low melting points blocks which are derived from compounds containing hydroxyl groups or carboxyl groups or mixtures thereof and having a number average molecular weight of 400–4000 and a melting point not greater than about 100° C., and (C) an amount of bifunctional radicals sufficient to join repeating blocks (A) and (B) to form a multi-block copolyester, the weight ratio of (A) and (B) being from about 8:1 to 1:4, said multi-block copolyester having a melting point below about 175° C., and a melt flow rate of at least 0.4 g/10 minutes at 190° C.,
   (b) about 5–45 parts per 100 parts of said multi-block copolyester of a bromine containing organic flame retardant containing at least 50% by weight bromine,
   (c) about 0.20–1.5 parts per part of said bromine containing organic flame retardant of antimony trioxide,
   (d) a drip suppressant for the multi-block copolymer,
   (e) from about 30–60 parts per hundred parts multi-block copolyester of inorganic compounds comprising 60–75 percent alumina trihydrate and 25–40 percent of a magnesium compound selected from the group consisting of (1) magnesium carbonate, (2) magnesium oxide, and (3) particulate magnesium hydroxide with 90 percent of the particles of magnesium hydroxide having a maximum dimension no more than 1 micrometer and the particles being surface treated to prevent agglomeration, and
   (f) containing 0.1–5 parts per 100 parts copolyester of a coupling agent having a hydrolyzable moiety containing titanium or silicon and an organophilic group.

2. A thermoplastic composition of claim 1 wherein the magnesium compound is magnesium carbonate.

3. A thermoplastic composition of claim 1 wherein the magnesium compound is magnesium oxide.

4. A thermoplastic composition of claim 1 wherein the magnesium oxide is coated with calcium stearate.

5. A thermoplastic composition of claim 1 containing from about 25-65 parts per hundred parts multi-block copolyester of inorganic compounds comprising 12-50% of the magnesium compound, magnesium hydroxide and the balance alumina trihydrate and calcium carbonate with the proviso that the amount of calcium carbonate is not greater than the amount of alumina trihydrate.

6. A thermoplastic composition of claim 2 containing 25-40 percent magnesium hydroxide, 25-44 percent alumina trihydrate and 25-44 percent calcium carbonate.

7. A thermoplastic composition of claim 1 wherein the hydrolyzable moieties are aliphatic orthosilicate or orthotitanate groups.

8. A thermoplastic composition of claim 1 wherein the repeating high melting point blocks are derived from ethylene glycol or 1,4-butanediol and terephthalic acid alone or mixtures of terephthalic acid with up to about 30% by weight isophthalic acid or ortho-phthalic acid or mixtures thereof.

9. A thermoplastic composition of claim 1 wherein the repeating low melting point blocks are derived from poly(alkylene oxide) glycols having a carbon to oxygen atomic ratio of about 2.0-4.3 and a number average molecular weight of about 400-4000.

10. A thermoplastic composition of claim 1 wherein the poly(alkylene oxide) glycol is poly(tetramethylene oxide) glycol having a number average molecular weight of 600-2000.

11. A thermoplastic composition of claim 10 wherein the poly(alkylene oxide) glycol is ethylene-oxide capped poly(propylene oxide) glycol having a number average molecular weight of 1500-2800 and an ethylene oxide content of 15-35% by weight.

12. A thermoplastic composition of claim 1 wherein the repeating low melting point blocks are derived from polyester glycols.

13. A thermoplastic composition of claim 1 wherein the bromine-containing flame retardant is N,N'-ethylenebis(tetrabromophthalimide).

14. A thermoplastic composition of claim 1 wherein the drip suppressant is an organophilic clay which is the reaction product of at least one quaternary ammonium salt with a smectite-type clay having an ion exchange capacity of at least 75 meg/100 g of clay, said quaternary ammonium salts having the formula

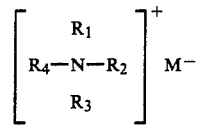

wherein $M^-$ is selected from the group consisting of chloride, bromide, iodide, nitrite, hydroxide, acetate, methyl sulfate and mixtures thereof, wherein $R_1$ is an alkyl group having 12 to 22 carbon atoms and wherein $R_2$, $R_3$ and $R_4$ are selected from the group consisting of hydrogen, alkyl groups containing 1 to 22 carbon atoms, aryl groups and aralkyl groups containing 1 to 22 carbon atoms in the alkyl chain.

15. A thermoplastic composition of claim 1 wherein the organophilic clay is the reaction product of bentonite clay with a mixture of 10-90% by weight dimethyl benzyl (hydrogenated tallow) ammonium chloride and 10-90% by weight dimethyl di(hydrogenated tallow) ammonium chloride.

16. A thermoplastic composition of claim 1 wherein the multi-block copolyester consists essentially of high melting point blocks derived from 1,4-butanediol and a mixture of terephthalic acid and isophthalic acid or esters thereof, and low melting point blocks derived from poly(tetramethylene oxide) glycol having a number average molecular weight of about 800-1200, the weight ratio of high melting point blocks to low melting point blocks being from 5:1 to 1:2, about 5-35 parts of N,N'-ethylenebis(tetrabromophthalimide), and about 0.3-0.6 parts per part of said bromine-containing flame retardant of antimony trioxide and about 2-10 parts per 100 parts of said multi-block copolyester of an organophilic clay which is the reaction product of bentonite clay with a mixture of 10-90% by weight dimethyl benzyl(hydrogenated tallow) and 10-90% by weight dimethyl di(hydrogenated tallow) ammonium chloride or 3-20 parts per 100 parts of said multi-block copolyester of fumed colloidal silica.

17. A thermoplastic composition of claim 1 wherein the drip suppressant is fumed colloidal silica.

18. A thermoplastic composition of claim 1 wherein the drip suppressant is organophilic clay in an amount of at least about 1 part per 100 parts multi-block copolyester.

19. A thermoplastic composition of claim 1 wherein the melting point of the multi-block copolyester is from 130°-170° C.

20. A thermoplastic composition of claim 1 wherein the weight ratio of (A) to (B) is from about 5:1 to 1:2.

21. A fiber optic cable jacketed with the composition of claim 1.

22. A bundle of conductive wires jacketed with the composition of claim 1.

23. A bundle of conductive wires jacketed with the composition of claim 7.

* * * * *

UNITED STATES PATENT AND TRADEMARK OFFICE
CERTIFICATE OF CORRECTION

PATENT NO. : 4,826,899

DATED : May 2, 1989

INVENTOR(S) : Richard Watkin Rees

It is certified that error appears in the above-identified patent and that said Letters Patent is hereby corrected as shown below:

In the Claims, column 20, line 29, change "Ieast" to --least--, in column 20, line 31, change "points" to --point--, and in column 20, line 51, change "copolymer" to --copolyester--.

Signed and Sealed this

Seventeenth Day of April, 1990

Attest:

HARRY F. MANBECK, JR.

*Attesting Officer*     *Commissioner of Patents and Trademarks*